(12) United States Patent
Dowdell

(10) Patent No.: US 8,437,968 B2
(45) Date of Patent: May 7, 2013

(54) METHOD AND APPARATUS FOR CALCULATING THE MAXIMUM DISPLACEMENT OF A ROTATING SHAFT

(75) Inventor: Kevin Dowdell, Pittsburgh, PA (US)

(73) Assignee: ABB Technology AG, Zurich (CH)

( * ) Notice: Subject to any disclaimer, the term of this patent is extended or adjusted under 35 U.S.C. 154(b) by 624 days.

(21) Appl. No.: 12/673,115

(22) PCT Filed: Aug. 5, 2008

(86) PCT No.: PCT/US2008/009387
§ 371 (c)(1),
(2), (4) Date: Feb. 11, 2010

(87) PCT Pub. No.: WO2009/023105
PCT Pub. Date: Feb. 19, 2009

(65) Prior Publication Data
US 2011/0213574 A1 Sep. 1, 2011

Related U.S. Application Data

(60) Provisional application No. 60/955,777, filed on Aug. 14, 2007.

(51) Int. Cl.
*G01F 17/00* (2006.01)

(52) U.S. Cl.
USPC .......................................................... 702/56

(58) Field of Classification Search ................ 702/56
See application file for complete search history.

(56) References Cited

U.S. PATENT DOCUMENTS 7,210,321 B2 * 5/2007 George ...................... 72/31.03
7,912,572 B2 * 3/2011 Du et al. ...................... 700/174

* cited by examiner

*Primary Examiner* — Aditya Bhat
(74) *Attorney, Agent, or Firm* — Michael Charles Prewitt; Denis Ticak

(57) ABSTRACT

A method is disclosed for monitoring the vibration of a rotating shaft including, measuring a current shaft position and determining a centroid of the shaft. The current shaft sector is then determined. The current distance between the centroid and the current shaft position may then be determined. The current distance is compared with a previously stored maximum distance for that sector, and if greater, the current shaft position and current distance is stored as the new maximum for that sector. After a predetermined period of time, the maximum displacement between the stored maximum positions is calculated, which represents the maximum shaft displacement peak to peak. This value may then be visually displayed or automatically monitored by shaft control computers.

18 Claims, 4 Drawing Sheets

METHOD AND APPARATUS FOR CALCULATING THE MAXIMUM DISPLACEMENT OF A ROTATING SHAFT

CROSS-REFERENCE TO RELATED APPLICATION

This application claims priority to U.S. Provisional Patent Application No. 60/955,777, filed on Aug. 14, 2007, which is incorporated herein by reference as if fully set forth herein.

FIELD OF THE INVENTION

This invention relates to rotating shaft monitoring and more particularly to monitoring the vibration and maximum displacement of rotating shafts.

BACKGROUND

Vibration monitoring of rotating machines, such as turbine generators, is often useful when trying to prevent bearing damage, calculate maintenance cycles and monitor overall system performance. One useful measure of vibration is known as Smax, which is the maximum displacement of a rotating machinery shaft within a bearing over a given period of time. Smax is typically measured by using two displacement sensors mounted proximate to a rotating shaft and circumferentially offset by a known angle.

Prior art methods of calculating or estimating Smax often include large error rates, some as high as 30%. Other methods may have lower error rates but require too much computation to enable real-time output to an operator or control equipment.

Thus, there is a need in the art for a method of calculating Smax that both reduces inherent errors while being simple enough to compute a near real-time output.

SUMMARY OF THE INVENTION

According to one exemplary embodiment of the present invention, a method for monitoring the vibration of a rotating shaft is disclosed and includes the steps of measuring a current shaft position, determining a centroid of the shaft, determining a sector in which the current shaft position is located, determining the current distance between the centroid and the current shaft position, comparing the current distance with a previously stored maximum displacement for that sector, and if greater, storing the current shaft position as the new stored maximum position for that sector and storing the current distance as the new stored maximum distance for that sector, repeating the above steps for a predetermined period of time, calculating, after the predetermined period of time, the maximum displacement between the stored maximum positions, which represents the maximum shaft displacement peak to peak, and visually displaying or automatically monitoring the maximum shaft displacement peak to peak to as an indicator of shaft vibration.

According to another embodiment of the present invention, a digital processing unit is disclosed for monitoring the vibration of a rotating shaft. The digital processing unit includes a computing device having programmable code configured to receive sensor measurements correlating to a current shaft position, determine the current distance between the centroid of the rotating shaft and the current shaft position, determine a sector in which the current shaft position is located, determine whether the current distance is a maximum for that sector, and if greater, store the current shaft position as the new stored maximum position for that sector and store the current distance as the new stored maximum distance for that sector, repeat steps the above steps for a predetermined period of time, calculate, after the predetermined period of time, the maximum displacement between the stored maximum positions, which represents the maximum shaft displacement peak to peak, and output the maximum displacement peak to peak value to a visual display or computerized shaft controller.

DETAILED DESCRIPTION

Figure 1:
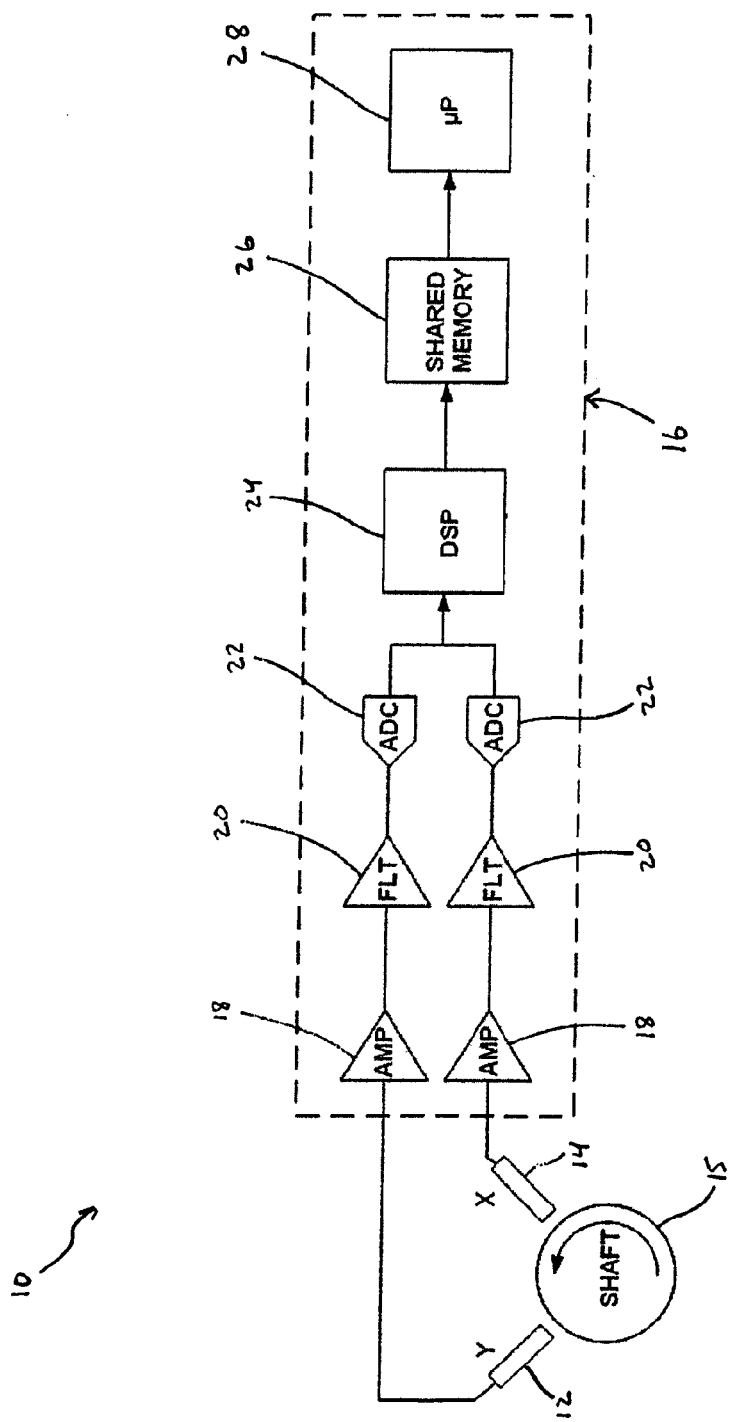
FIG. 1 shows a diagram for hardware in which the method of the present invention is executed.

Referring now to FIG. 1, a measurement apparatus is shown schematically and is generally indicated by the numeral 10. Apparatus 10 includes a first and second vibration sensor 12 and 14 mounted in close proximity to a rotating shaft 15. As shown in FIG. 1, first and second sensors 12 and 14 may be angularly offset by 90 degrees. It should be appreciated, however, that this orientation may not always be practical due to obstructions around shaft 15. Therefore, as will become apparent, the present invention is capable of compensating for any angular offset other than 180 degrees.

A digital processing unit 16 receives and processes the information received from the vibration sensors. Digital processing unit 16 includes a pair of analog operational amplifiers 18 that receive the vibration signals from sensors 12 and 14, condition the signal and thereafter transmit the conditioned signal to a pair of analog anti-aliasing filters 20. As is known in the art, anti-aliasing filters 20 remove unwanted high frequency noise to prevent sampling errors and noise. After passing through the anti-aliasing filters 20, the signals are received at analog-to-digital converters 22. The analog-to-digital converters 22 convert each analog signal into a digital signal. That digital signal is thereafter transmitted to a digital signal processor 24 which, as will become evident, processes the data stream and periodically writes it to shared memory 26. Thereafter, a microprocessor 28 periodically reads the shared memory 26 and performs the required calculations.

Figure 2:
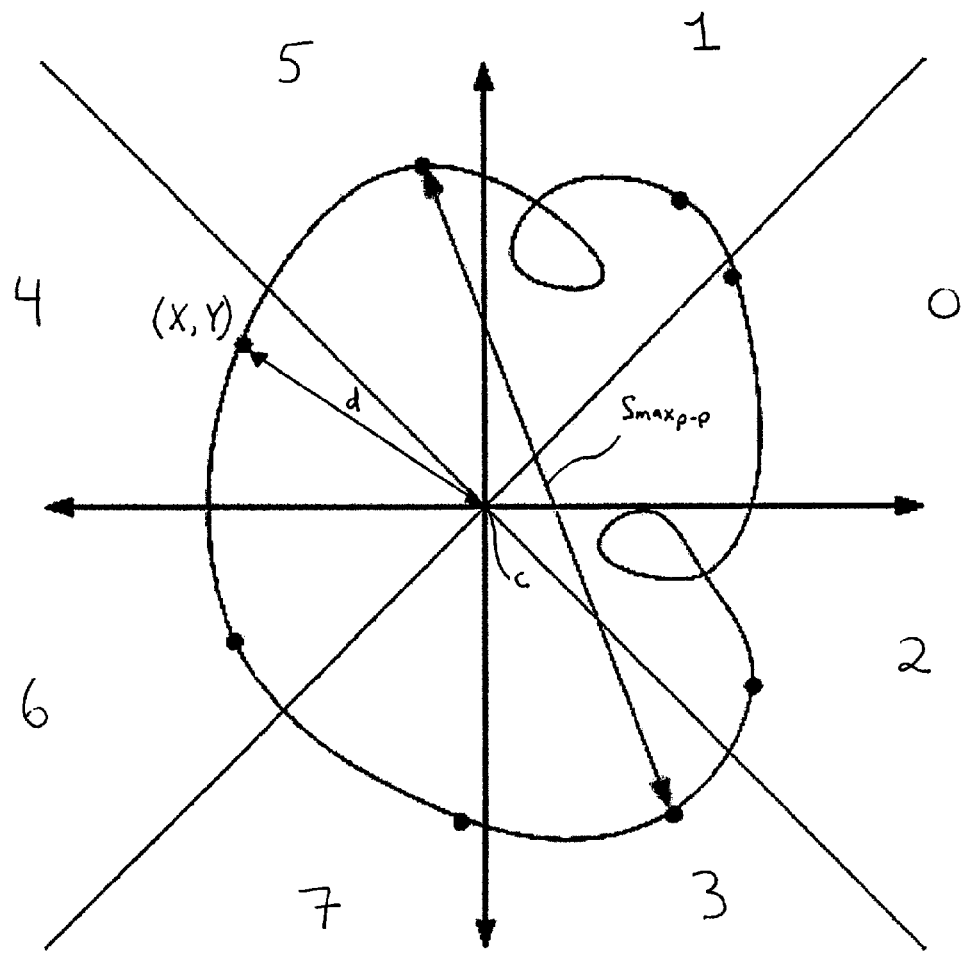
FIG. 2 shows a diagram exemplifying a plot of the samples, the octants, and the maximum displacement.

Referring now to FIG. 2, a representative plot is shown of the movement of the center of shaft 15 during rotation. Shaft movement may be generally circular, elliptical, figure-8 shaped, or even wildly erratic. The method according to the present invention divides the Cartesian coordinate plot evenly into sectors with the center-point C determined by a running average. In the present example and following method, eight sectors or octants are illustrated. It should be appreciated, however that any number of sectors may be used, to be determined based on available computing speed and required resolution.

As each data point, (X,Y) is measured, a distance from the centroid C is calculated, along with a determination of the corresponding sector. For example, the measured point P includes coordinates (X,Y), resides in sector four (4) and is a distance d from centroid C. This distance from the centroid C is then compared against the previous maximum for that sector. If the current distance from the centroid is greater than the previous max, the current distance replaces the previous maximum. These measurements are continuously taken and compared against previous maximums for a predetermined period of time. At the close of that period of time, the data set including the maximum distance from the centroid for each sector, along with the corresponding coordinates, is sent to shared memory for the microprocessor to analyze. After the data is sent to shared memory, the variables are initiated again and the aforementioned process is repeated.

At microprocessor 28, the distance between each of the eight stored points is calculated. The greatest point to point distance is the maximum displacement peak to peak ($SMAX_{p-p}$). In the present example, it should be appreciated that, because the plot is not perfectly circular or elliptical, $SMAX_{p-p}$ does not run through the centerpoint. The $SMAX_{p-p}$ value may thereafter be displayed to an operator in real-time as an indication of the maximum vibration of a shaft. Alternately, it may be read by a controller that automatically shuts down shaft 15 if $SMAX_{p-p}$ exceeds some predetermined limit. In yet another embodiment, if $SMAX_{p-p}$ or an average value of $SMAX_{p-p}$ exceeds some predetermined value, it may trigger an automatic maintenance notice.

Figure 3:
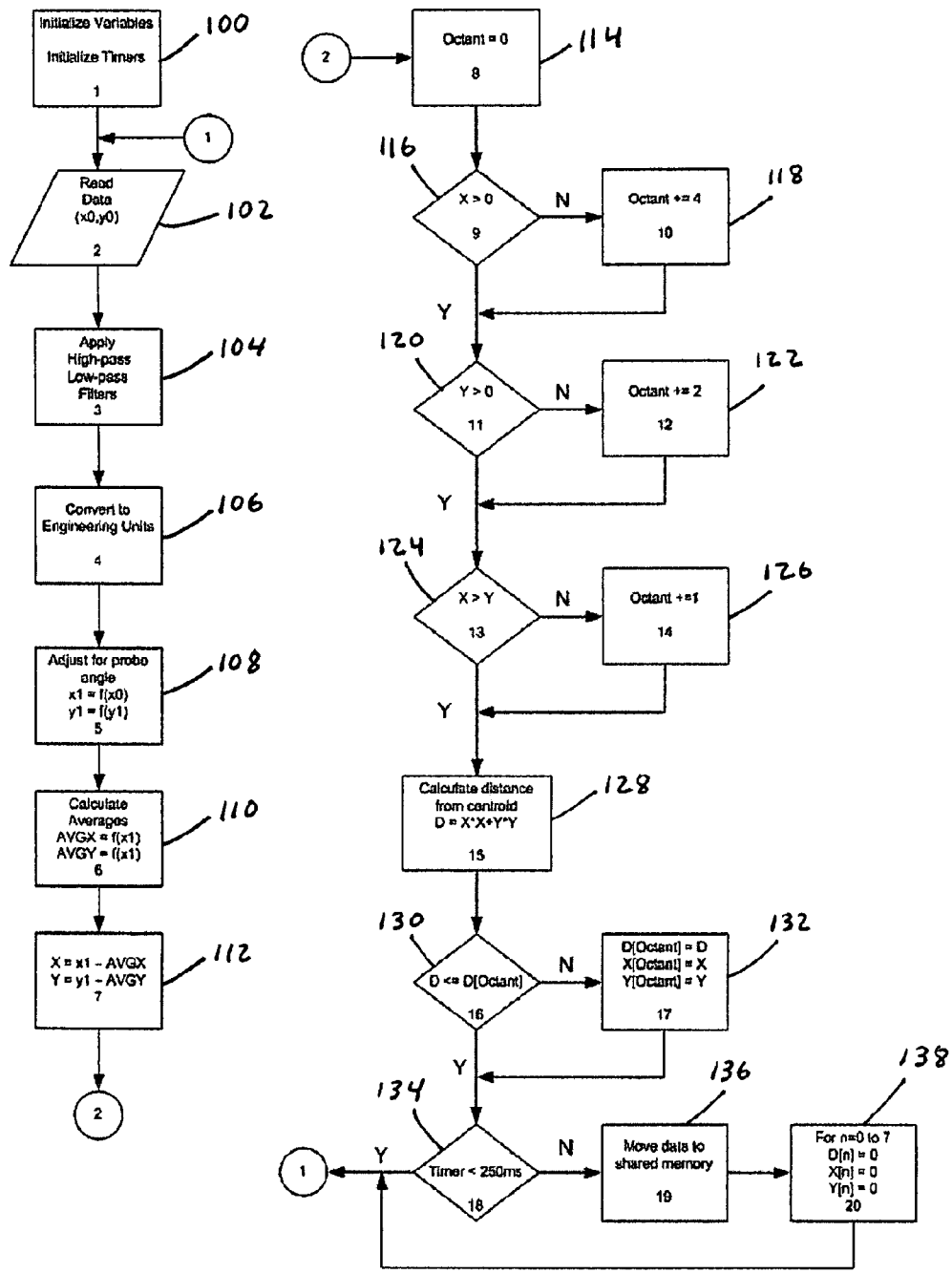
FIG. 3 shows a flow diagram for the method of the present invention.
Figure 4:
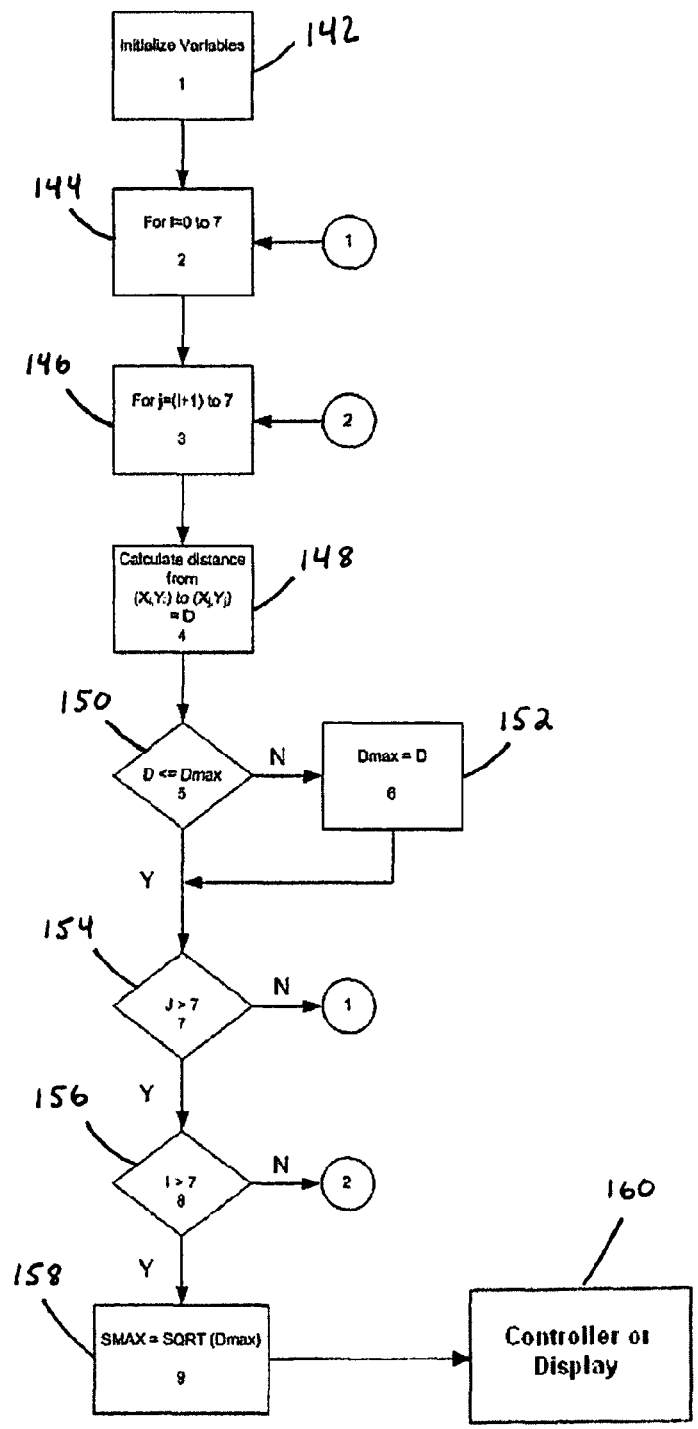
FIG. 4 shows a flow diagram for the method of the present invention.

Referring now to FIGS. 3 and 4, the method of the present invention is disclosed. In the present embodiment, the steps shown in FIG. 3 represent an algorithm executed in digital signal processor 24. The algorithm shown in FIG. 3, may be stored in memory or may be enabled by the physical architecture of digital signal processor 24. The steps shown in FIG. 4 represent an algorithm executed in the microprocessor 28 wherein the data generated in the digital signal processor 24 is processed and $SMAX_{p-p}$ values are output. It should of course be appreciated that alternate physical arrangements may be utilized, for example, the processes may be combined in a single processor or may be broken apart into a plurality of processors.

In a first step 100, the variables, registers and timers in digital signal processor 24 are initialized. In other words, $x_0$, $y_0$ and the timer are reset to zero. After initialization, new data points are received from the digital to analog converter 22 at 102. A high-pass and low-pass filter is then applied to the data points at 104. The corner or cutoff frequencies of the high and low-pass filters are determined from input parameters specified by the user. Because the data received from vibration sensors 12 and 14 are typically a voltage signal, they must be correlated to a distance. Thus, at 106, the data is converted to engineering units that will provide a common basis for later mathematical computations.

The data is then adjusted to Cartesian coordinates using the probe angles specified by the user. These angles correlate to the angular displacement of each vibration sensor 12 and 14 from a user specified fixed location, typically vertical. The trigonometric formula is:

$$x_1 = x * K_{x1} + y * K_{x2}$$

$$y_1 = y * K_{y1} + x * K_{y2}$$

where:

$$K_{x1} = -\cos(\text{angle } Y)/(\sin(\text{angle } Y - \text{angle } X))$$

$$K_{x2} = \cos(\text{angle } X)/(\sin(\text{angle } Y - \text{angle } X))$$

$$K_{y1} = -\sin(\text{angle } X)/(\sin(\text{angle } Y - \text{angle } X))$$

$$K_{y2} = \sin(\text{angle } Y)/(\sin(\text{angle } Y - \text{angle } X))$$

The "K" coefficients may be calculated in microprocessor 28 and transferred to DSP 24 through shared memory 24. The horizontal and vertical conversion is done in DSP 24. The typical location angles used are +45 degrees and −45 degrees from vertical, in which case the function would not modify the coordinates. However, if the angles are other than +45 and −45 degrees the above referenced conversion formula converts the units to proper Cartesian coordinates. Thus, the output of step 108 is a data point $x_1$ and $y_1$ representing the current absolute location of the shaft center relative to the vibration sensors 12 and 14 at a given time.

Next, the centroid of the shaft rotation is determined. The centroid may be computed by any known means with the resulting AvgX and AvgY being used in later steps. The centroid may be determined by averaging the horizontal and vertical data for a specified time period. The centroid may also be determined by applying a low pass filter to the coordinates $x_1$ and $y_1$ thereby maintaining a continuous average.

The location of the data point relative to the centroid is calculated at 112. This operation subtracts AvgX from $x_1$ and AvgY from $y_1$ to give (X,Y). Once the current relative position (X,Y) is determined, the sub-set of steps, generally indicated by the numeral 112, determines the octant, between 0 and 7, that a given data point (X,Y) resides in. The octant variable is initially set to zero (0) at 114. Next, it is determined whether X is greater than zero (0) at 116. If not, at 118, four is added to the octant variable. If yes, nothing is added to the octant variable. Next, at 120, it is determined whether Y is greater than zero (0). If not, at 122, two is added to the octant variable. If yes, nothing is added to the octant variable. Finally, at 124, it is determined whether the absolute value of X is greater than the absolute value of Y. If not, at 126, a one (1) is added to the octant variable. If yes, nothing is added to the octant variable. In this manner, the data point is assigned to one of eight octants, from 0 to 7 (see FIG. 2).

Next, at 128, the current squared distance (D) from the centroid to point (X,Y) is calculated. The current squared distance (D) is then compared to the previously stored squared distance (D) for that octant at 130. If the current squared distance (D) is greater than the previously stored (D) for that octant, the value (D) as well as the corresponding (X,Y) are stored at 132. If the current squared distance (D) is not greater than the previously stored (D) for that octant, no values are changed. The squared distance is used in the present method because additional computation time is used if the square root is taken. However, the actual distance (square root of (D)) may be used interchangeably depending upon user preferences and available computing power.

It is next determined whether a preset amount of time has elapsed at 134. For example, in the present embodiment, 250 milliseconds is the preset time period, though the period can be any amount of time depending upon user requirements, shaft speed, computing speed and/or other system requirements. If the elapsed time is less than 250 milliseconds, the loop begins again at 102, wherein new data is received from the vibration sensors 12 and 14. If the timer value is greater than or equal to 250 milliseconds, at 136 the data values for (D) and (X,Y) for each octant are moved to shared memory for microprocessor 28 to access. Thereafter, the variables (D), and (X,Y) and time are zeroed at 138 and the loop begins again at 102. It should be appreciated that, though the present cycle period is time based, other methods may be used to determine the cycle period, such as a predetermined number of shaft rotations.

For every cycle period (in this case 250 milliseconds) thousands of data points are received from the vibration sensors 12 and 14, their distance from the centroid calculated, their respective octant assigned and finally, their squared distance compared against the previous maximum squared distance for that octant. The resulting data set, for every elapsed time period, is a maximum squared distance and corresponding X and Y coordinates for each octant. In this manner, irrelevant data is ignored, and the data moved to shared memory is only the maximum values for each octant, which the microprocessor can analyze quickly.

Referring now to FIG. 4, after the data set has been moved to the shared memory, it may then be acted on by microprocessor 28. In a first step, the variables are initialized at 142. Next, loop counters are initialized at 144 and 146. The square of the distance ($S^2$) from the "$i^{th}$" (X,Y) pair to the "$j^{th}$" (X,Y) pair is calculated at 148 according to the formula $S^2=(X_j-X_i)^2+(Y_j-Y_i)^2$. Next, at 150 the current value ($S^2$) is compared to a previously stored value ($S^2$max). If the current value ($S^2$) is greater than the stored value ($S^2$max), the current ($S^2$) is stored as the new ($S^2$max) at 152, otherwise, the execution continues to 154. At 154 it is determined whether j is greater than or equal to 7, if not, the loop proceeds to 146 wherein the next interger "j" is initialized. If, at 154, "j" is greater than or equal to 7 the execution proceeds to 156, where it is determined whether "i" is greater than or equal to 7. If not, the execution proceeds to 144 where the next interger "i" is initialized. If "i" is greater than or equal to 7, the execution proceeds to 158 where the square root of ($S^2$max) is taken to determine the maximum displacement of the shaft rotation peak to peak ($Smax_{p-p}$). In this embodiment the square root is not taken until the last step in order to save execution time. Thus, the above operation calculates the distance between the coordinates from each octant and then outputs the maximum.

The output ($Smax_{p-p}$) may be output at 160 and utilized for any number of uses. For example, the output may be transmitted to an operation center where it may be displayed and constantly refreshed on a computer monitor as a measure of shaft vibration. The output may also be transmitted to the shaft controller wherein if ($Smax_{p-p}$) exceeds a predetermined threshold the shaft may be automatically shut down. Further, the output may be stored locally and periodically downloaded for historical maintenance purposes. Still further, the output may be used to generate automatic maintenance reminders.

It should be appreciated that the present invention may take the form of a computer program product on a computer-usable or computer-readable medium having computer-usable program code embodied in the medium. The computer-usable or computer-readable medium may be any medium that can contain, store, communicate, propagate, or transport the program for use by or in connection with the instruction execution system, apparatus or device, etc. Non exhaustive examples of the computer-readable medium would include: a portable computer diskette, hard disk, random access memory (RAM), read only memory (ROM), flash memory, optical fiber, CD-ROM, optical storage device, transmission media such as those supporting the internet or intranet, or magnetic storage devices. The computer program code for carrying out operations of the present invention may be written in any suitable language, such as e.g. Java, Smalltalk, C++, Visual Basic, C, etc.

The methods of the present invention advantageously provide high speed real-time output of ($Smax_{p-p}$) measurements for any number of uses. Also, the resulting ($Smax_{p-p}$) measurement exhibits much less inherent error than prior art methods while calculating ($Smax_{p-p}$) values.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A method for monitoring the vibration of a rotating shaft comprising:
   (A) measuring a current shaft position with at least one sensor and storing the current shaft position on a non-transient computer readable medium of a processing unit;
   (B) determining a centroid of the shaft with at least one processor of a processing unit;
   (C) determining a sector in which the current shaft position is located with the at least one processor;
   (D) determining the current distance between the centroid and the current shaft position with at least one processor;
   (E) comparing the current distance with a previously stored maximum distance for that sector with the at least one processor, and if greater, storing the current shaft position as the new stored maximum position for that sector and storing on the non-transient computer readable medium the current distance as the new stored maximum distance for that sector;
   (F) repeating steps (A)-(E) for a predetermined period of time;
   (G) calculating, after the predetermined period of time, the maximum displacement between the stored maximum positions with the at least one processor, which represents the maximum shaft displacement peak to peak; and
   (H) visually displaying with a visual display or automatically monitoring with the at least one processor the maximum shaft displacement peak to peak to as an indicator of shaft vibration.

2. The method of claim 1, wherein the step of determining a centroid of the shaft further comprises calculating a running average of the x and y components of shaft position for a predetermined number of previous cycles with the at least one processor.

3. The method of claim 1, wherein the step of determining a centroid of the shaft further comprises applying a low pass filter to current shaft position measurements.

4. The method of claim 1, wherein the step of measuring a current shaft position includes providing a pair of angularly offset vibration sensors in proximity with the shaft.

5. The method of claim 4, wherein the vibration sensors may be selected from the group consisting of proximity probes, eddy current probes, or displacement probes.

6. The method of claim 4, wherein steps (B)-(F) are performed in a digital signal processor which is in electrical communication with the vibration sensors.

7. The method of claim 6, wherein after the predetermined period of time, the digital signal processor transmits the stored maximum positions correlating to each sector to shared memory.

8. The method of claim 7, wherein step (G) is performed by a microprocessor that analyzes the stored maximum positions in the shared memory.

9. The method of claim 1, wherein the current shaft position is located in one of eight evenly spaced sectors.

10. The method of claim 1, wherein steps (A)-(H) are continuously repeated to provide real-time calculation of maximum shaft displacement peak to peak.

11. The method of claim 10, wherein the real-time calculation of maximum shaft displacement peak to peak is monitored by an shaft controller, and if the maximum shaft displacement peak to peak exceeds a predetermined value, the shaft controller automatically stops rotation of the shaft.

12. The method of claim 1, wherein the visual displaying is performed on a computer monitor in a control room.

13. A digital processing unit for monitoring the vibration of a rotating shaft comprising a computing device having a non-transitory computer readable medium containing computer instructions stored therein for causing at least one computer processor to:
(A) receive sensor measurements correlating to a current shaft position;
(B) determine the current distance between the centroid of the rotating shaft and the current shaft position;
(C) determine a sector in which the current shaft position is located;
(D) determine whether the current distance is a maximum for that sector, and if greater, store the current shaft position as the new stored maximum position for that sector and store the current distance as the new stored maximum distance for that sector;
(E) repeat steps (A)-(D) for a predetermined period of time;
(F) calculate, after the predetermined period of time, the maximum displacement between the stored maximum positions, which represents the maximum shaft displacement peak to peak; and
(G) output the maximum displacement peak to peak value to a visual display or computerized shaft controller.

14. The digital processing unit of claim 13, wherein the computing device is configured to determine the centroid of the rotating shaft by calculating a running average of the shaft position.

15. The digital processing unit of claim 13, wherein the current shaft position is located in one of eight evenly spaced sectors.

16. The digital processing unit of claim 13, further comprising a digital signal processor and a microprocessor, wherein the digital signal processor is configured to perform functions (A)-(E) and wherein the microprocessor is configured to perform functions (F) and (G).

17. The digital processing unit of claim 16, wherein after the predetermined period of time, the digital signal processor transmits the stored maximum positions correlating to each sector to shared memory.

18. The digital processing unit of claim 13, wherein the computing device continuously repeats functions (A)-(G) to provide real-time calculation of maximum shaft displacement peak to peak.

* * * * *